United States Patent
Lee et al.

(10) Patent No.: US 11,080,815 B2
(45) Date of Patent: Aug. 3, 2021

(54) METHOD AND WEARABLE DEVICE FOR ADJUSTING OVERDRIVING INFORMATION OF DISPLAY ON BASIS OF USER'S MOTION INFORMATION

(71) Applicant: Samsung Electronics Co., Ltd., Gyeonggi-do (KR)

(72) Inventors: Minwoo Lee, Gyeonggi-do (KR); Sehoon Kim, Gyeonggi-do (KR); Seoyoung Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/963,592

(22) PCT Filed: Jan. 31, 2019

(86) PCT No.: PCT/KR2019/001362
§ 371 (c)(1),
(2) Date: Jul. 21, 2020

(87) PCT Pub. No.: WO2019/156430
PCT Pub. Date: Aug. 15, 2019

(65) Prior Publication Data
US 2021/0065330 A1  Mar. 4, 2021

(30) Foreign Application Priority Data
Feb. 7, 2018 (KR) .................. 10-2018-0015315

(51) Int. Cl.
*G06T 3/00* (2006.01)
*G02B 27/01* (2006.01)
(Continued)

(52) U.S. Cl.
CPC .......... *G06T 3/0056* (2013.01); *G02B 27/017* (2013.01); *G06F 1/163* (2013.01); *G06F 3/012* (2013.01); *G06T 19/006* (2013.01)

(58) Field of Classification Search
CPC combination set(s) only.
See application file for complete search history.

(56) References Cited

U.S. PATENT DOCUMENTS 10,140,955 B1 * 11/2018 Richards .................. G09G 5/10
2014/0361977 A1  12/2014 Stafford et al.
(Continued)

FOREIGN PATENT DOCUMENTS

JP  2015-95045 A   5/2015
JP  2017-146607 A  8/2017
(Continued)

*Primary Examiner* — Jeffery A Brier
(74) *Attorney, Agent, or Firm* — Cha & Reiter, LLC

(57) ABSTRACT

Various embodiments of the present invention relate to a method and a wearable device for increasing a response rate of a display. An electronic device according to various embodiments of the present invention comprises: a display; a sensor module; and a processor electrically connected to the display and the sensor module, wherein the processor is configured to: sense movement of a user through the sensor module while the display displays a current frame image; predict a subsequent frame image on the basis of the sensed movement of the user, set overdriving information on the basis of the subsequent frame image; and display the subsequent frame image at least on the basis of the overdriving information by using the display. Other various embodiments are possible.

15 Claims, 14 Drawing Sheets

(51) Int. Cl.
*G06F 3/01* (2006.01)
*G06T 19/00* (2011.01)
*G06F 1/16* (2006.01)

(56) References Cited

U.S. PATENT DOCUMENTS

| | | |
|---|---|---|
| 2015/0228248 A1 | 8/2015 | Croxford |
| 2016/0063919 A1 | 3/2016 | Ha et al. |
| 2016/0282619 A1 | 9/2016 | Oto et al. |
| 2018/0321493 A1 | 11/2018 | Kim et al. |
| 2019/0244369 A1 | 8/2019 | Lim et al. |

FOREIGN PATENT DOCUMENTS

| | | |
|---|---|---|
| KR | 10-2015-0093592 A | 8/2015 |
| KR | 10-2016-0026584 A | 3/2016 |
| KR | 10-2017-0004816 A | 1/2017 |
| KR | 10-2017-0058758 A | 5/2017 |
| KR | 10-2018-0005528 A | 1/2018 |

\* cited by examiner

FIG. 7C
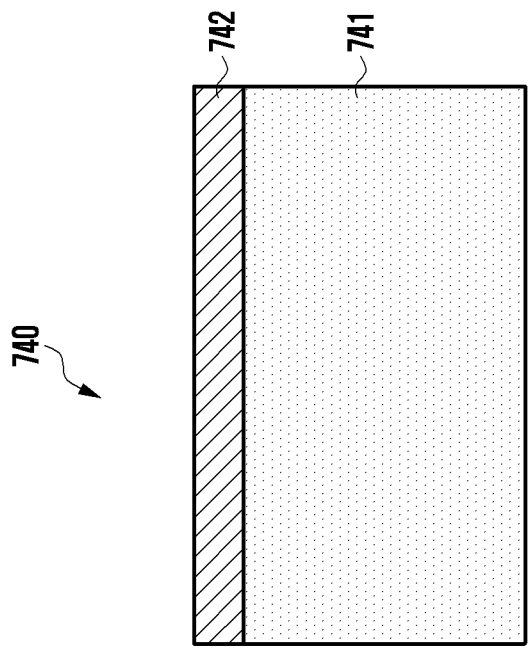
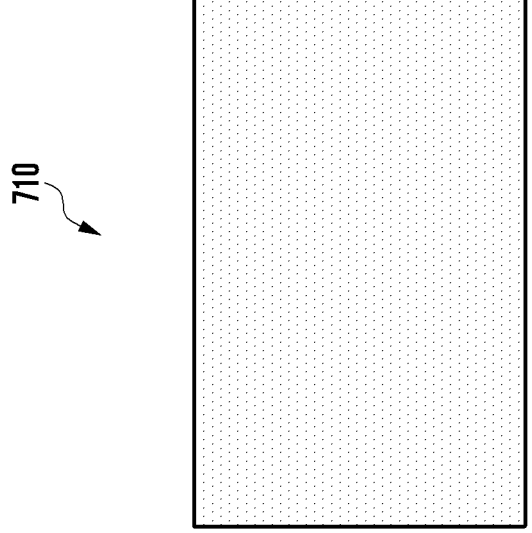

FIG. 7D
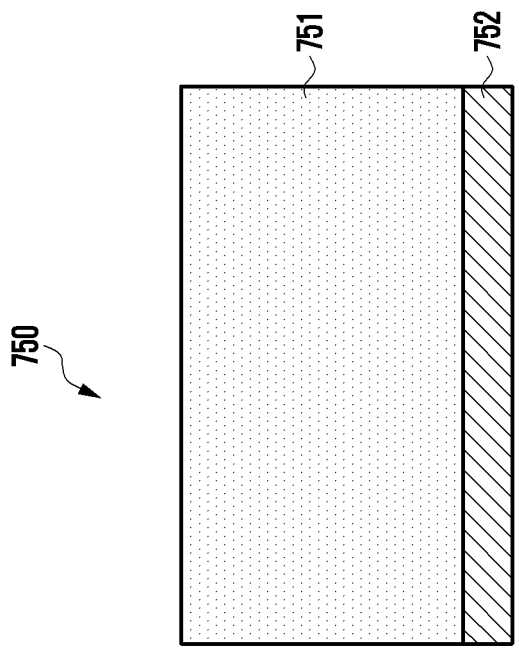
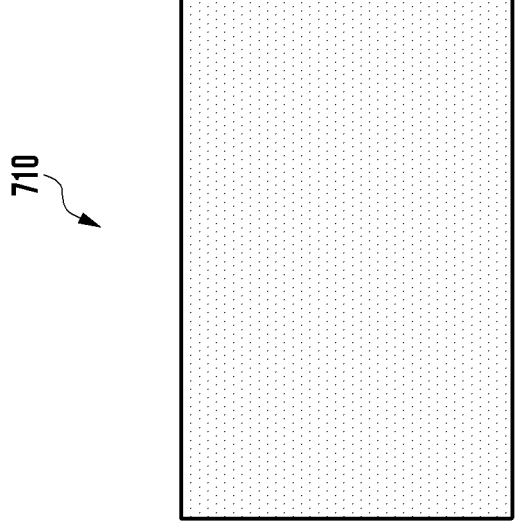

& 1

METHOD AND WEARABLE DEVICE FOR ADJUSTING OVERDRIVING INFORMATION OF DISPLAY ON BASIS OF USER'S MOTION INFORMATION

CROSS REFERENCE TO RELATED APPLICATIONS

This application is a National Phase Entry of PCT International Application No. PCT/KR2019/001362, which was filed on Jan. 31, 2019, and claims a priority to Korean Patent Application No. 10-2018-0015315, which was filed on Feb. 7, 2018, the contents of which are incorporated herein by reference.

TECHNICAL FIELD

The disclosure relates to a method and a wearable device for increasing the response speed of a display.

BACKGROUND ART

Various wearable devices are being developed in sync with the trend wherein electronic devices are manufactured to be lightweight and small. A head-mounted device (HMD), which is one of the types of wearable devices, may be an electronic device that a user wears on the user's head so as to receive multimedia content or to experience virtual reality (VR) or augmented reality (AR). The HMD may be provided in one of various forms, such as glasses, a helmet, or the like, that allow the HMD to be worn on the head.

DISCLOSURE OF INVENTION

Technical Problem

In order to display a realistic image according to a user movement, a conventional HMD may control a display so as to convert an omnidirectional image into a view image viewed at a different angle, in response to sensing a rotation of the head of a user (or the movement of a user visual line).

In the conventional HMD, a deterioration, such as motion blurring, tailing, or generation of an afterimage (e.g., ghosting), in image quality may occur since the speed of a response that converts a frame image displayed on a screen of the display from an omnidirectional image to a view image viewed at a different angle is slow.

According to various embodiments, there are provided a method and a wearable device for preventing deterioration in image quality, when the wearable device converts a frame image displayed on a screen of a display, based on a user movement or a device movement.

Solution to Problem

In accordance with an aspect of the disclosure, an electronic device may include: a display; a sensor module; and a processor electrically connected to the display and the sensor module, wherein the processor is configured to: sense a user movement using the sensor module, while the display displays a current frame image; predict a subsequent frame image, based on the sensed user movement; set overdriving information, based on the subsequent frame image; and control the display to display the subsequent frame image on the display, based at least on the overdriving information.

In accordance with another aspect of the disclosure, an electronic device may include: a display; a sensor module; and a processor electrically connected to the display and the sensor module, wherein the processor is configured to perform: sensing a user movement using a sensor module, while the display displays a current frame image; predicting a subsequent frame image, based on the sensed user movement; transmitting the predicted subsequent frame image to the display; performing control so that the display sets overdriving information, based on the predicted subsequent frame image; and controlling the display to display the subsequent frame image, based on the overdriving information.

In accordance with another aspect of the disclosure, a control method of an electronic device for increasing a response speed of a display may include: sensing a user movement using the sensor module, while the display displays a current frame image; predicting a subsequent frame image, based on the sensed user movement; setting overdriving information, based on the subsequent frame image; and performing control so as to display the subsequent frame image on the display, based at least on the overdriving information.

In accordance with another aspect of the disclosure, a control method of an electronic device for increasing a response speed of a display may include: sensing a user movement using a sensor module, while the display displays a current frame image; predicting a subsequent frame image, based on the sensed user movement; transmitting the predicted subsequent frame image to the display; performing control so that the display sets overdriving information, based on the predicted subsequent frame image; and performing control so that the display displays the subsequent frame image, based on the overdriving information.

Advantageous Effects of Invention

Before a processor generates a subsequent frame image, an electronic device of the disclosure may predict the subsequent frame image, based on a current frame, so as to determine overdriving information in advance. Therefore, even though the electronic device of the disclosure is not equipped with a separate frame buffer, the electronic device is capable of performing overdriving, and thus the electronic device can increase the response speed of a display and can prevent a deterioration, such as motion blurring, tailing, or generation of an afterimage (e.g., ghosting), in the image quality of the display

BRIEF DESCRIPTION OF DRAWINGS

FIGS. 7A to 7D are diagrams illustrating examples of a subsequent frame image according to various embodiments;

MODE FOR THE INVENTION

Figure 1:
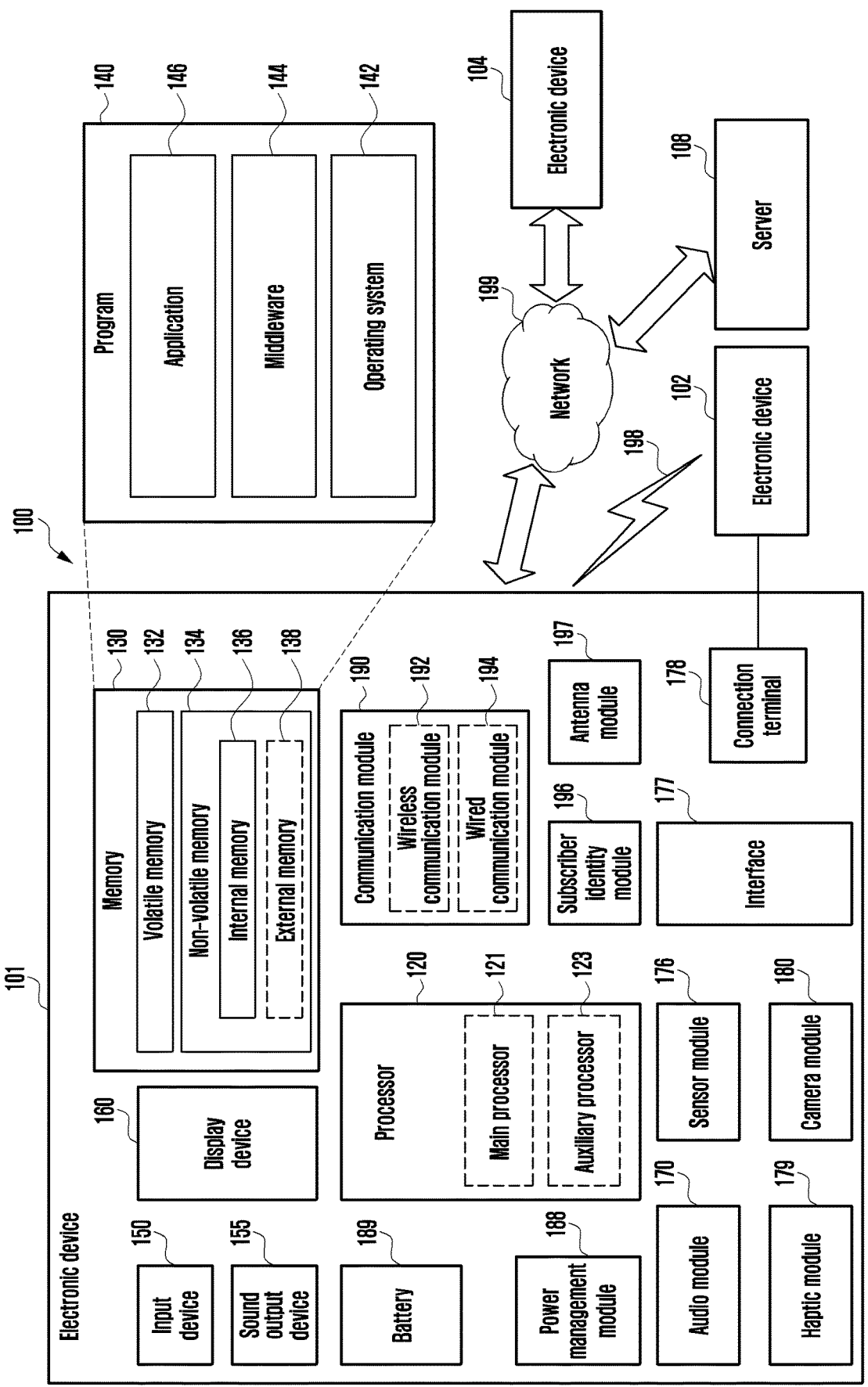
FIG. 1 is a block diagram of an electronic device for adjusting the response speed of a display based on user movement information, in a network environment, according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
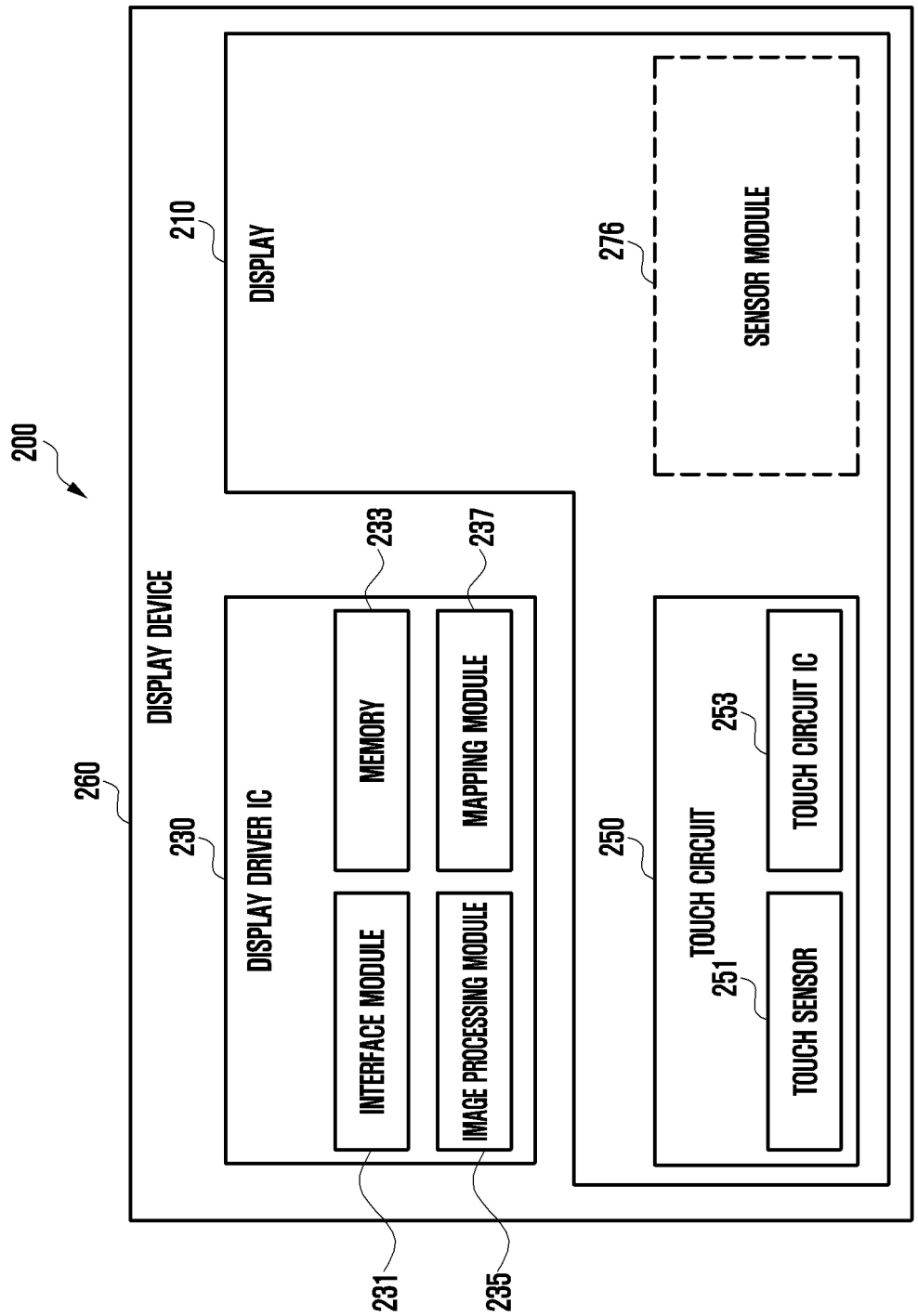
FIG. 2 is a block diagram of a display device for adjusting the response speed of a display, based on user movement information, according to various embodiments.

FIG. 2 is a block diagram 200 illustrating the display device 160 according to various embodiments. Referring to FIG. 2, the display device 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 150 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 150)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

An electronic device (e.g., an electronic device 300 of FIG. 3) according to various embodiments may include: a display (a display 330 of FIG. 3); a sensor module (e.g., a sensor module 320 of FIG. 3); and a processor (e.g., a processor 310 of FIG. 3) electrically connected to the display 330 and the sensor module 320, wherein the processor 310 may be configured to: sense a user movement using the sensor module 320, while the display 330 displays a current frame image; predict a subsequent frame image, based on the sensed user movement; set overdriving information, based on the subsequent frame image; and perform control so as to display the subsequent frame image on the display 330, based at least on the overdriving information. The processor 310 may extract, based on the sensed user movement, a shifted image obtained by changing at least a part of coordinate values related to the current frame image, and may estimate that the subsequent frame image includes the shifted image. The processor 310 may be configured to: in response to a fact that the user movement is made in a first direction, change a first coordinate value related to the current frame image to a second coordinate value related to a second direction, which is opposite to the first direction; and extract the shifted image based on the second coordinate value obtained via changing. The processor 310 may change the coordinate value in proportion to a magnitude of the sensed user movement. The processor 310 may be configured to: set an area related to the extracted shifted image as an overdriving area; and obtain the overdriving information associated with the overdriving area. The processor 310 may be configured to: compare the current frame image and the predicted subsequent frame image, in the overdriving area; and determine the overdriving information, based on a result of the comparison. The processor 310 may be configured to: calculate a difference value between first data information corresponding to the current frame image and second data information corresponding to the predicted subsequent frame image, in the overdriving area; and generate the overdriving information by converting the second data information to enable the difference value to be high. The processor 310 may be configured to sense a user head movement or a user visual line movement, using the sensor module 320. The display 330 may include a liquid crystal display 330, an OLED display 330, or a micro LED display 330. The electronic device 300 may be a head-mounted-device (HMD).

An electronic device (e.g., the electronic device 300 of FIG. 3) according to various embodiments may include: a display (the display 330 of FIG. 3); a sensor module (e.g., the sensor module 320 of FIG. 3); and a processor (e.g., the processor 310 of FIG. 3) electrically connected to the display 330 and the sensor module 320, wherein the processor 310 may be configured to: sense a user movement using the sensor module 320, while the display 330 displays a current frame image; predict a subsequent frame image, based on the sensed user movement; transmit the predicted subsequent frame image to the display 330; perform control so that the display 330 sets overdriving information, based on the predicted subsequent frame image; and perform control so that the display 330 displays the subsequent frame image, based on the overdriving information.

Figure 3:
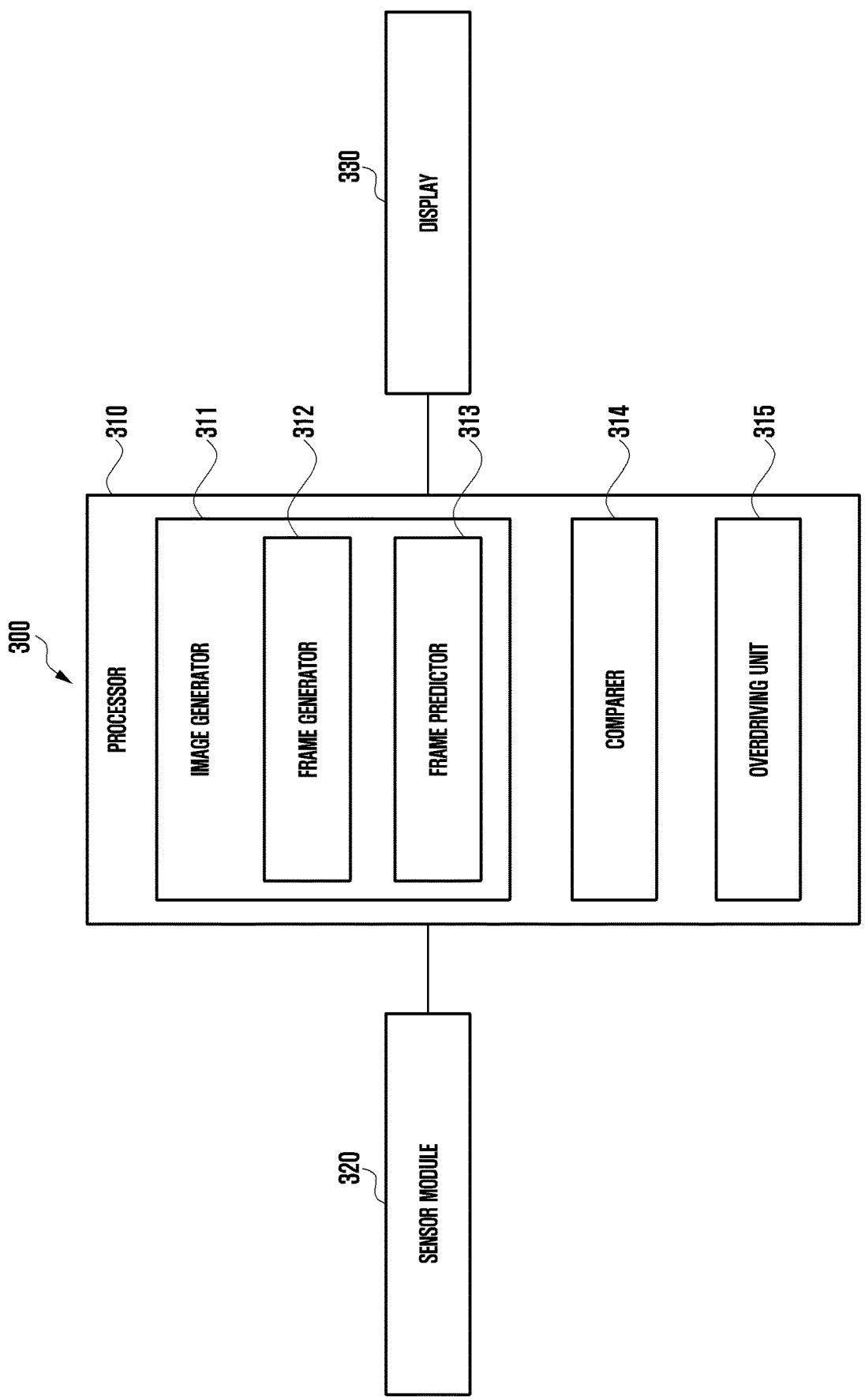
FIG. 3 is a schematic diagram of an electronic device according to various embodiments of the disclosure.

FIG. 3 is a schematic diagram of an electronic device according to various embodiments of the disclosure.

Referring to FIG. 3, the electronic device 300 (e.g., the electronic device 101 of FIG. 1) according to various embodiments may include the sensor module 320 (e.g., the sensor module 176 of FIG. 1), the processor 310 (e.g., the processor 120 of FIG. 1), and the display 330 (e.g., the display device 160 of FIG. 1).

According to an embodiment, the sensor module 320 may sense a movement of a user who wears the electronic device 300, and may transfer sensing information to the processor 310. For example, the sensor module 320 may sense a rotation of the head of the user who wears the electronic device 300. Alternatively, the sensor module 320 may sense a movement of the visual line of the user. Alternatively, the sensor module 320 may sense a movement of at least a part of the body of the user. According to an embodiment, the sensor module 320 may sense a user movement, based on information provided from an external device, and may transfer sensing information to the processor 310. According to an embodiment, the sensor module 320 may include a gesture sensor, a gyro sensor, a pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

According to an embodiment, the processor 310 may include an image generator 311, a comparer 314, or an overdriving unit 315.

According to an embodiment, the image generator 311 may be configured to generate a frame image, and to transmit the generated frame image to the display 330. According to an embodiment, the image generator 311 may predict a subsequent frame image in response to sensing a user movement, and may apply an overdriving weight to at least a part of the subsequent frame image, based on the predicted result. For example, the image generator 311 may include a frame generator 312 or a frame predictor 313.

According to an embodiment, the frame generator 312 may generate a frame image by a predetermined period (e.g., 60 Hz or 120 Hz) based on a currently running application, and may transfer the generated frame image to the display 330.

According to an embodiment, while the display 330 displays a current frame image, the frame predictor 313 may sense a user movement using the sensor module 320, and may predict a subsequent frame image, based on the sensed user movement. For example, based on the sensed user movement, the frame predictor 313 may extract a shifted image having coordinate values changed from the coordinate values at which the current frame image is mapped to the display 330, and may estimate that a subsequent frame image includes the shifted image. For example, a subsequent frame image to be displayed on the display 330 in response to a user movement may include a first part corresponding to the shifted image and a second part generated newly according to a movement of the visual line of the user. According to an embodiment, the frame predictor 313 may set the ratio of the second part to the entire predicted subsequent frame image to be larger, as the user movement is relatively large. According to an embodiment, the frame predictor 313 may determine the position of the first part and the position of the second part, based on the direction of the user movement. For example, in response to sensing that the visual line of the user moves in a first direction, the frame predictor 313 may dispose the second part in the first direction and may dispose the first part in a second part which is opposite to the first direction.

According to an embodiment, the comparer 314 may set an area at which the extracted shifted image is mapped to the display 330, as an overdriving area. For example, the overdriving area may be a pixel area at which overdriven data information is provided in a subsequent frame. According to an embodiment, the overdriven data information may be determined based on a result of comparison between the current frame image and the predicted subsequent frame image. Hereinafter, the overdriven data information is defined to be "overdriving information".

According to an embodiment, the comparer 314 may compare the current frame image and the predicted subsequent frame image, in the overdriving area. For example, the comparer 314 may compare a plurality of first gradation values used when the current frame image is mapped to a plurality of pixels of the display 330 and a plurality of second gradation values used when the predicted subsequent frame image is mapped to the plurality of pixels of the display 330. According to an embodiment, the comparer 314 may transfer a result of comparison between the current frame image and the predicted subsequent frame image to the overdriving unit 315. For example, by assuming the shift to the subsequent frame image which is predicted from the current frame image, the comparer 314 may measure a variation in data information provided to each pixel, and may transmit the variation measured for each pixel to the overdriving unit 315.

According to an embodiment, the overdriving unit 315 may determine the overdriving information, based on a result of comparison between the current frame image and the predicted subsequent frame image. For example, the overdriving information may include a weight value applied to data information applied to the plurality of pixels of the display 330. The electronic device 300 according to various embodiments may predict a subsequent frame image in advance, based on a user movement, and thus may perform overdriving without an additional frame buffer. Accordingly, the electronic device 300 may prevent a deterioration, such as motion blurring, tailing, or generation of an afterimage (e.g., ghosting), in image quality of the display 330. According to some embodiments, the overdriving unit 315 may be implemented as at least a part of the display 330. For example, the comparer 314 of the processor 310 may transmit a result of comparison between the current frame image and the predicted subsequent frame image to the display 330, and the overdriving unit 315 implemented in the display 330 may determine overdriving information according to the above-described operations. According to other embodiments, the comparer 314 and the overdriving unit 315 may be implemented as at least a part of the display 330. For example, the frame predictor 313 of the processor 310 may transmit a predicted subsequent frame image to the display 330, and the comparer 314 and the overdriving unit 315 implemented in the display 330 may determine overdriving information according to the above-described operations.

According to an embodiment, the display 330 may be configured to receive a frame image from the processor 310, and to display the received frame image. According to an embodiment, the display 330 may display at least a part of the received frame image as a view area, based on a user movement. For example, the view area may be a visible area within a threshold range which a user can view in a designated range of vision or at a designated viewing angle in a virtual reality space provided by a HMD 400 (see FIG. 4) which is a wearable device. According to an embodiment, the display 330 may include at least one selected from among a liquid crystal display, an OLED display, or a micro LED display.

Figure 4:
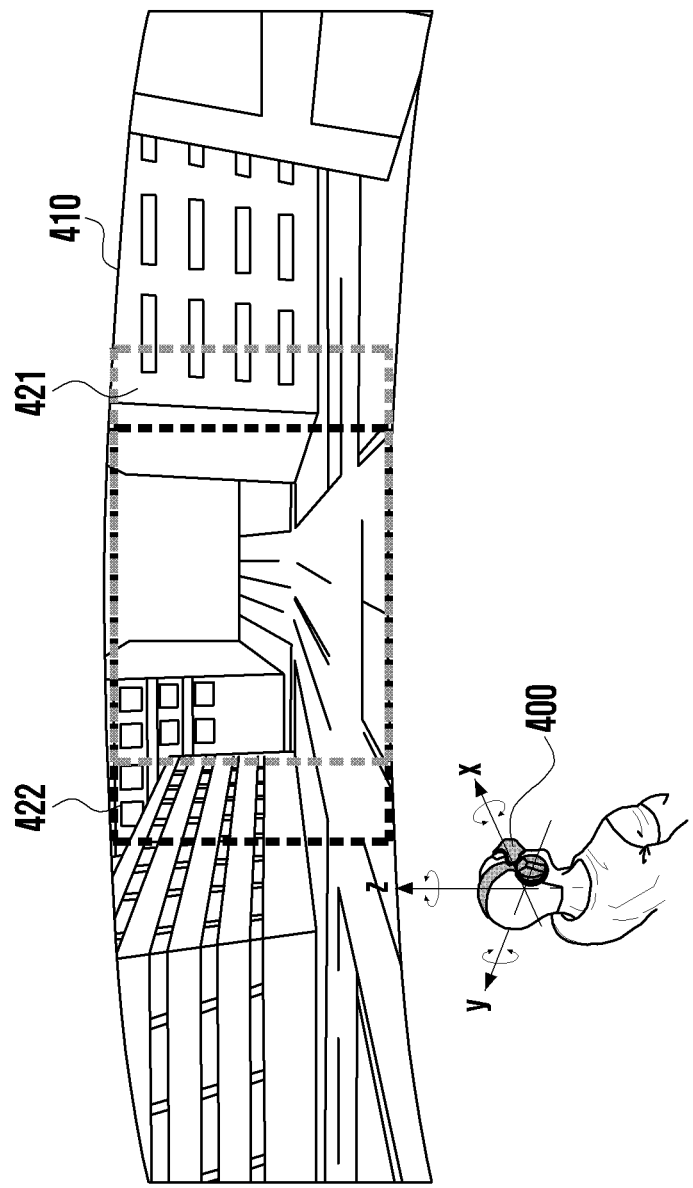
FIG. 4 is a diagram illustrating an example of a wearable device that is worn.

FIG. 4 is a diagram illustrating an example of a wearable device that is worn.

Referring to FIG. 4, an electronic device 400 according to various embodiments of the disclosure may be a device (e.g., a HMD) that is the electronic device 300 of FIG. 3 implemented in a wearable form. According to some embodiments, the electronic device 400 may be a device (e.g., a HMD) that is detachable from the electronic device 300 of FIG. 3, and may be functionally connectable to the electronic device 300 of FIG. 3. A user can use a multimedia content, or can experience virtual reality (VR), augmented reality (AR), or mixed reality (MR) by wearing the electronic device 400. For example, the electronic device 400 may control the display 330 so that a user can experience virtual reality 410 (e.g., immersive media or the like) based on a currently running application. According to an embodiment, the electronic device 400 may sense that a user moves the user's head to the left and right, and may control the display 330 so that a view area is shifted within the virtual reality 410 (e.g., augmented reality or mixed reality) in response to a result of sensing. For example, the electronic device 400 may control the display 330 so as to shift the view area in the horizontal direction and to display another part of the virtual reality 410. According to an embodiment, while the display 330 displays a first view area 421 which is a part of the virtual reality 410, the electronic device may sense a user movement. When the user movement is sensed, the electronic device may control the display 330 to display a second view area 422, which is shifted from the first view area 421, in a subsequent frame. According to an embodiment, the second view area 422 may be another part of the virtual reality 410, and may include an overlap area in which objects of the first view area 421 are shifted and displayed. In the above-description, "overlap area" may be the same meaning as "first part" mentioned in the description of FIG. 3.

The range of a movement of a user during a first frame duration (e.g., 60 Hz or 120 Hz) in which a frame image is converted in a usage environment of the electronic device 400 may not be large. Accordingly, a change in a view area displayed on the display 330 during the first frame duration may not be large. Therefore, the portion of the overlap area in the second view area 422 that the display 330 displays in a subsequent frame is relatively large, and the portion of a new area to which objects are newly added and displayed may be relatively small. Therefore, the processor 310 of the electronic device 400 may mostly predict a subsequent frame image, before generating and transmitting the subsequent frame image to the display 330. In the above-description, "new area" may be the same meaning as "second part" mentioned in the description of FIG. 3.

According to an embodiment, before generating and transferring a subsequent frame image to the display 330, the processor 310 may obtain the gradation values of objects included in the overlap area, based on data information corresponding to a current frame image, may obtain a variation in coordinate values at which the objects included in the overlap area are mapped to the display 330, based on sensing a user movement, and may predict the subsequent frame image in advance based on the obtained information (the gradation values in the overlap area and a change in coordinates of the overlap area). Before the processor 310 generates a subsequent frame image, the electronic device 300 of the disclosure may predict the subsequent frame image, based on a current frame, so as to determine overdriving information in advance. Therefore, even though the electronic device 300 of the disclosure is not equipped with a separate frame buffer, the electronic device 300 is capable of performing overdriving, and thus the electronic device 300 can prevent a deterioration, such as motion blurring, tailing, or generation of an afterimage (e.g., ghosting), in the image quality of the display 330.

Figure 5:
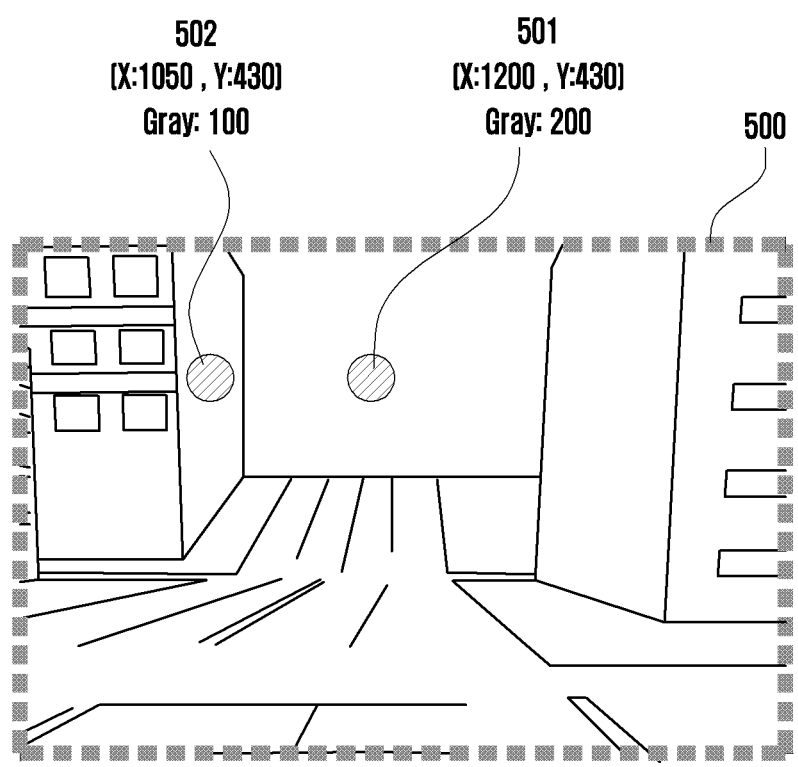
FIG. 5 is a diagram illustrating an example of a current frame image displayed on a display.
Figure 6:
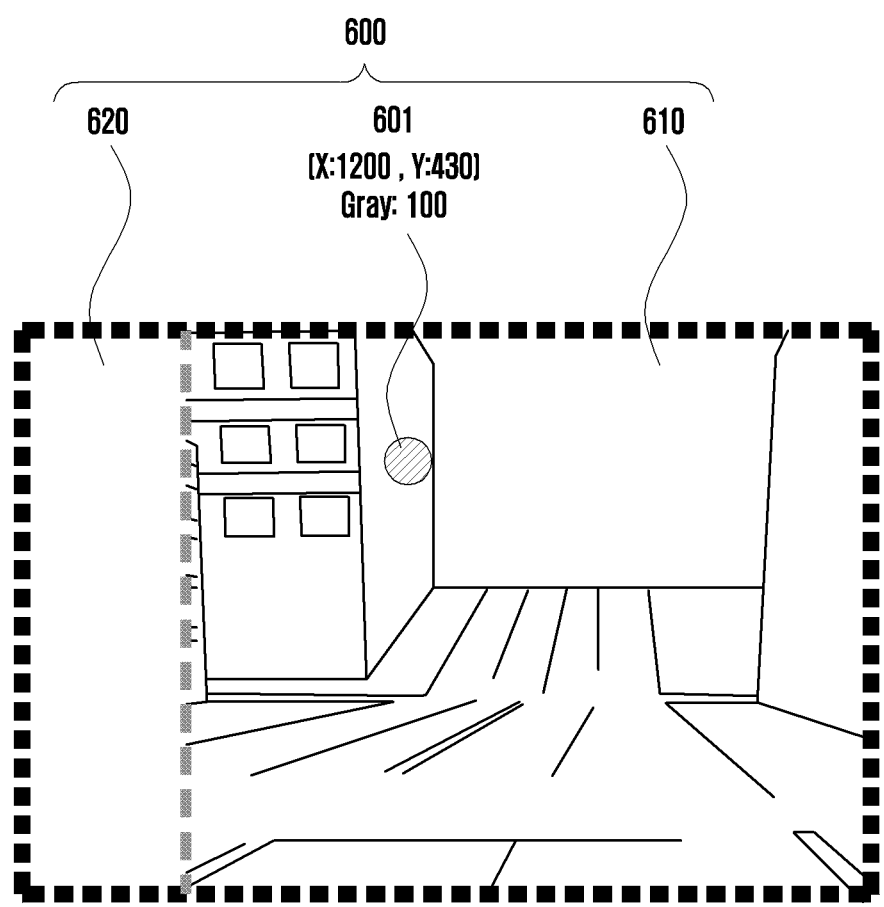
FIG. 6 is a diagram illustrating an example of a subsequent frame image that an electronic device of the disclosure predicts in advance.

Hereinafter, a method in which the electronic device 300 of the disclosure predicts a subsequent frame image in advance will be described in detail. FIG. 5 is a diagram illustrating a current frame image displayed on a display (e.g., the display 330 of FIG. 3). FIG. 6 is a diagram illustrating an example of a subsequent frame image that an electronic device (e.g., the electronic device 300 of FIG. 3) of the disclosure predicts in advance. For example, the image illustrated in FIG. 5 may be an image corresponding to the first view area 421 of the virtual reality 410 of FIG. 4, and the image illustrated in FIG. 6 may be an image corresponding to the second view area 422 of the virtual reality 410 of FIG. 4.

Referring to FIG. 5, the electronic device 400 may control a display (e.g., the display 330 of FIG. 3) to display a first view area 500 (e.g., the first view area 421 of FIG. 4) in a current frame. For example, an image corresponding to the first view area 500 may be set to have a graduation value of 200 at a first coordinate value 501 (X:1200, Y:430) of the display 330, and may be set to have a graduation value of 100 at a second coordinate value 502 (X:1050, Y:430) of the display 330.

Referring to FIG. 6, in response to sensing a user movement in the current frame, the processor (e.g., the processor 310 of FIG. 3) of the electronic device 400 may predict at least a part 610 of a subsequent frame image 600 corresponding to a second view area 600 (e.g., the second view area 422 of FIG. 4), in response to sensing a user movement. For example, the processor 310 may determine the second view area 600, which is shifted from the first view area (e.g., the first view area 500 of FIG. 5), based on information associated with a sensed user movement, and may determine an overlap area 610 in which the objects of the first view area 500 are duplicately displayed and a new area 620 in which objects are newly added and displayed, in the second view area 600. According to an embodiment, the processor 310 may predict images corresponding to the overlap area 610 in advance, based on the current frame image (e.g., the current frame image 500 of FIG. 5). For example, the processor 310 may obtain gradation values of the objects included in the overlap area 610 and a variation in coordinate values, based on data information corresponding to the current frame image 500, and may predict a subsequent frame image in advance, based on the obtained information. For example, the frame predictor 313 of the processor 310 may determine that the second view area 600, which is the predicted subsequent image, includes a shifted image obtained by shifting the objects of the first view area 500, which is the current frame image, by 150 in the X direction. Therefore, as illustrated in FIG. 6, the frame predictor 313 of the processor 310 may estimate that the subsequent frame image has a gradation value of 100 at the first coordinate value 601 (X:1200, Y:430) of the display (e.g., the display 330 of FIG. 3), which is the same as the gradation value mapped to the second coordinate value 502 (X: 1050, Y:430) of FIG. 5.

FIGS. 7A to 7D are diagrams illustrating examples of a subsequent frame image according to various embodiments.

Referring to FIGS. 7A to 7D, the frame predictor 313 of the processor (e.g., the processor 310 of FIG. 3) according to an embodiment may predict a subsequent frame image, based on a user movement, and may determine the location of a first part that displays a shifted image obtained by shifting the objects of the current frame image 710 based on a user movement, for example, a user visual line movement, and may determine the location of a second part that displays a new object, based on a user visual line movement.

Figure 7A:
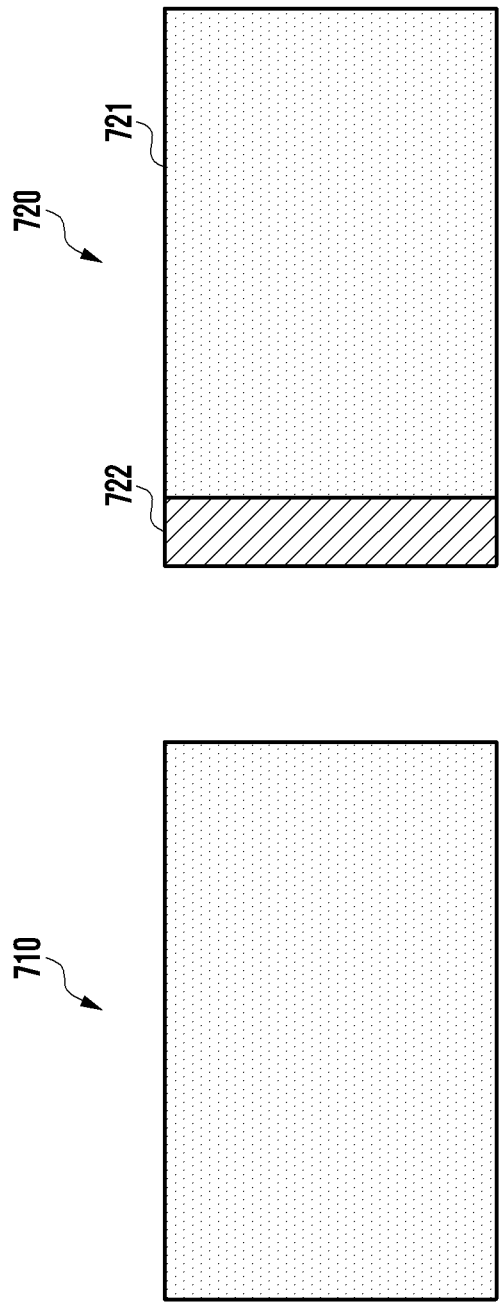

For example, as illustrated in FIG. 7A, in response to sensing that a user visual line moves to the left, the frame predictor 313 may determine a subsequent frame image 720 in which a first part 721 displaying a shifted image is disposed in the relatively right side, and a second part 722 displaying a new object based on the user visual line movement, is disposed in the relatively left side.

Figure 7B:
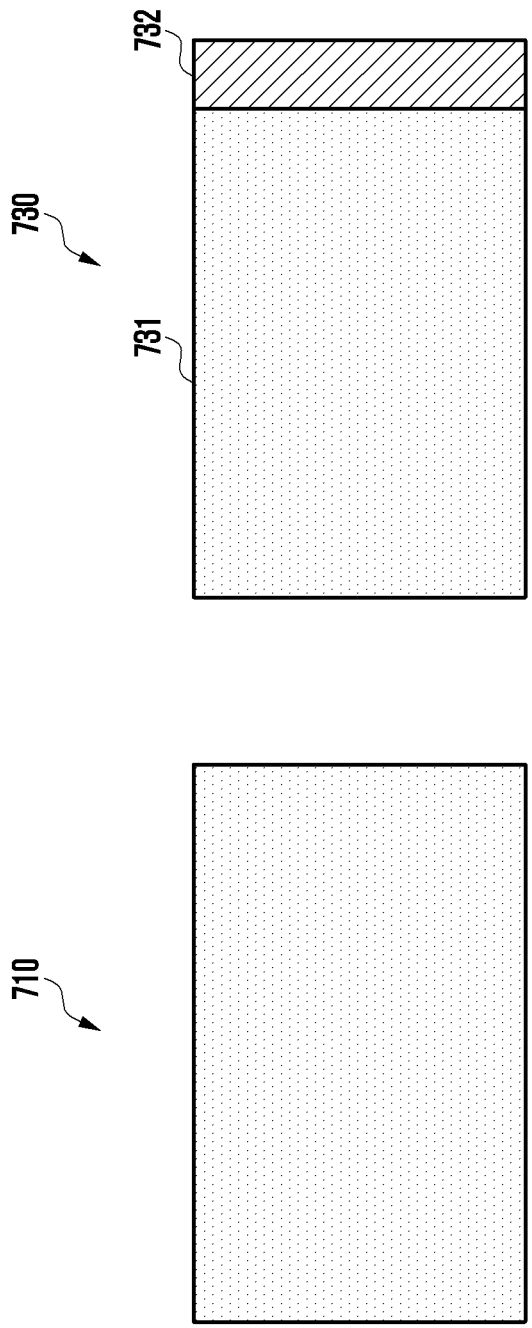

For example, as illustrated in FIG. 7B, in response to sensing that a user visual line moves to the right, the frame predictor 313 may determine a subsequent frame image 730 in which a first part 731 displaying a shifted image is disposed in the relatively left side, and a second part 732 displaying a new object based on the user visual line movement, is disposed in the relatively right side.

For example, as illustrated in FIG. 7C, in response to sensing that a user visual line moves in the upper direction, the frame predictor 313 may determine a subsequent frame image 740 in which a first part 741 displaying a shifted image is disposed in the relatively lower side, and a second part 742 displaying a new object based on the user visual line movement, is disposed in the relatively upper side.

For example, as illustrated in FIG. 7D, in response to sensing that a user visual line moves in the lower direction, the frame predictor 313 may determine a subsequent frame image 750 in which a first part 751 displaying a shifted image is disposed in the relatively upper side, and a second part 752 displaying a new object based on the user visual line movement, is disposed in the relatively lower side.

Figure 8:
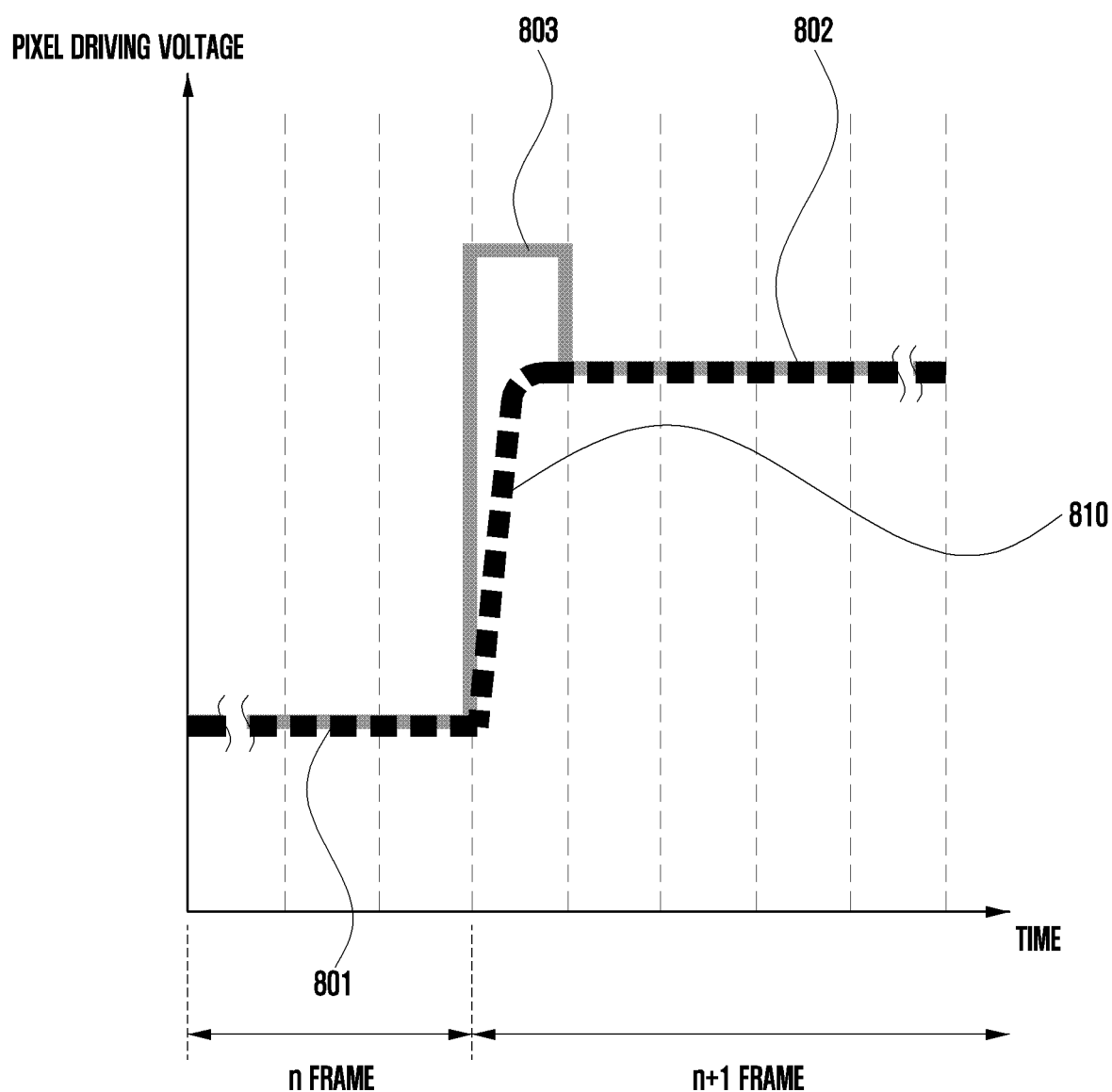
FIG. 8 is a graph of a pixel driving voltage used for illustrating the operation of overdriving.

FIG. 8 is a graph of a pixel driving voltage used for illustrating the operation of overdriving.

According to an embodiment, an overdriving unit (e.g., the overdriving unit 315 of FIG. 3) may determine overdriving information, based on a result of comparison between a current frame image (e.g., the current frame image 500 of FIG. 5) and a predicted subsequent frame image (e.g., the predicted subsequent frame image 600 of FIG. 6). For example, the overdriving information may include a weight value applied to data information applied to a plurality of pixels of a display (e.g., the display 330 of FIG. 3). For example, as illustrated in FIG. 6, data information applied to a predetermined pixel in the current frame (n frame) may be set to a first voltage 801, and data information which is estimated to be applied to the predetermined pixel in a subsequent frame (n+1 frame) may be set to a second voltage 802 which is higher than the first voltage 801. For example, the overdriving unit 315 may apply a third voltage 803, which is higher than the second voltage 802, to the predetermined pixel during a predetermined period of time in which the current frame (n frame) is converted to the subsequent frame (n+1 frame), and thus a pixel driving voltage that drives the predetermined pixel is quickly changed. Even though the electronic device of the disclosure (e.g., the electronic device 300 of FIG. 3) is not equipped with a separate frame buffer, the electronic device is capable of performing overdriving, and thus the electronic device can prevent a deterioration, such as motion blurring, tailing, or generation of an afterimage (e.g., ghosting), in the image quality of the display 330.

A control method of an electronic device for increasing the response speed of a display (e.g., the display 330 of FIG. 3) according to various embodiments may include: sensing a user movement using a sensor module (e.g., the sensor module 320 of FIG. 3), while the display 330 displays a current frame image; predicting a subsequent frame image, based on the sensed user movement; setting overdriving information, based on the subsequent frame image; and performing control so as to display the subsequent frame image on the display 330, based at least on the overdriving information. The operation of predicting the subsequent frame image may include: extracting, based on the sensed user movement, a shifted image obtained by changing at least a part of coordinate values related to the current frame image; and estimating that the subsequent frame image includes the shifted image. The operation of predicting the subsequent frame image may include: in response to a fact that the user movement is made in a first direction, changing a first coordinate value related to the current frame image to a second coordinate value related to a second direction, which is opposite to the first direction; and extracting the shifted image based on the second coordinate value obtained via changing. The operation of predicting the subsequent frame image may include: changing the coordinate value in proportion to the magnitude of the sensed user movement. The operation of setting the overdriving information may include: setting an area related to the extracted shifted image as an overdriving area; and obtaining the overdriving information associated with the overdriving area. The operation of setting the overdriving information may include: comparing the current frame image and the predicted subsequent frame image, in the overdriving area; and determining the overdriving information, based on a result of the comparison. The operation of setting the overdriving information may include: calculating a difference value between first data information corresponding to the current frame image and second data information corresponding to the predicted subsequent frame image, in the overdriving area; and generating the overdriving information by converting the second data information to enable the difference value to be high.

A control method of an electronic device (e.g., the electronic device 300 of FIG. 3) for increasing a response speed of a display (e.g., the display 330 of FIG. 3) may include: sensing a user movement using a sensor module (e.g., the sensor module 320 of FIG. 3), while the display displays a current frame image; predicting a subsequent frame image, based on the sensed user movement; transmitting the predicted subsequent frame image to the display 330; performing control so that the display sets overdriving information, based on the predicted subsequent frame image; and performing control so that the display 330 displays the subsequent frame image, based on the overdriving information. The operation of predicting the subsequent frame image may include: extracting, based on the sensed user movement, a shifted image obtained by changing at least a part of coordinate values related to the current frame image; and estimating that the subsequent frame image includes the shifted image. The operation of setting the overdriving information may include: setting an area related to the extracted shifted image as an overdriving area; and obtaining the overdriving information associated with the overdriving area.

Figure 9:
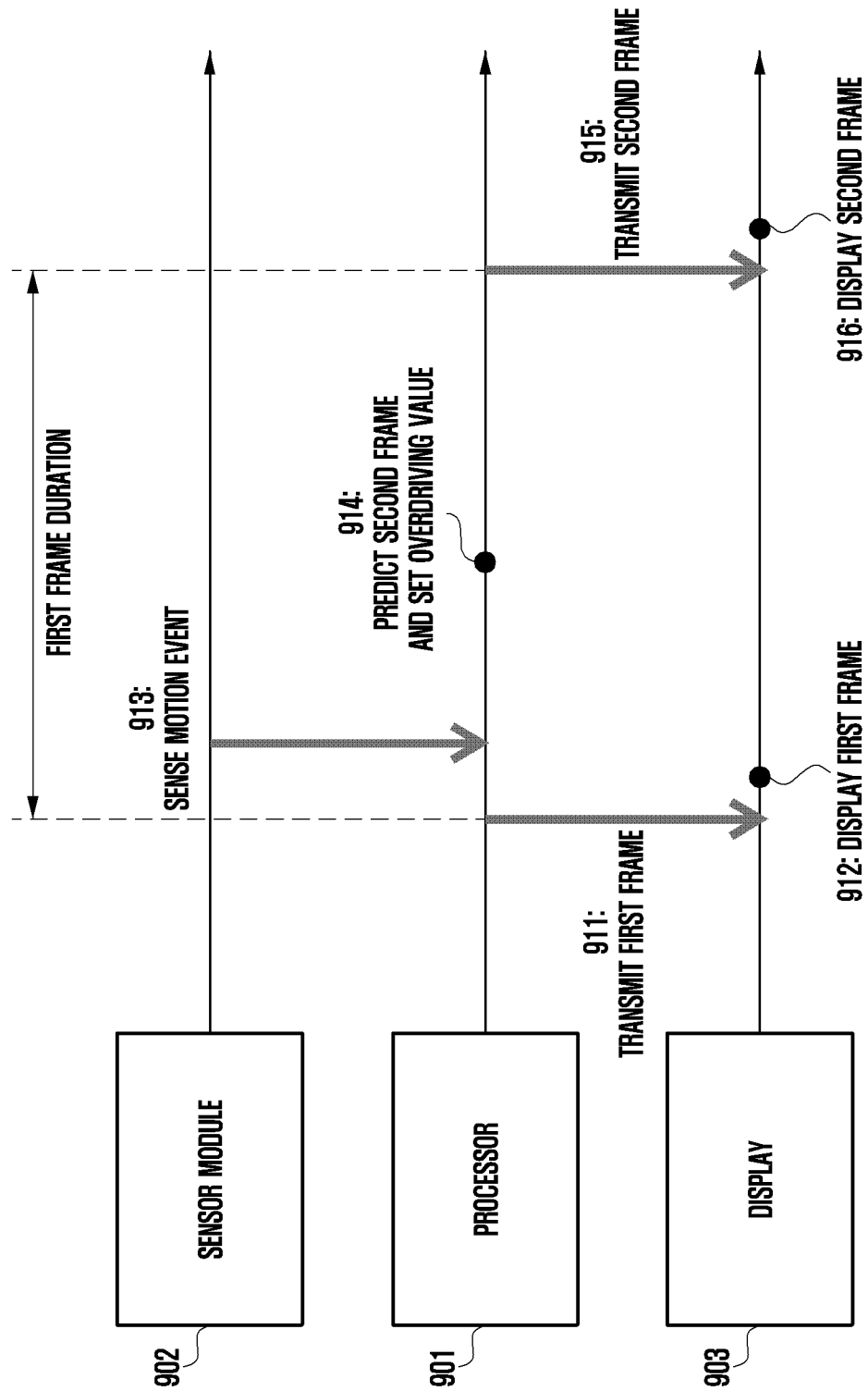
FIG. 9 is an operational flowchart of an electronic device according to an embodiment of the disclosure.

FIG. 9 is an operational flowchart of an electronic device according to an embodiment of the disclosure.

Referring to FIG. 9, a frame generator (e.g., the frame generator 312 of FIG. 3) of a processor 901 (e.g., the processor 310 of FIG. 3) according to an embodiment may generate a first frame, which is a current frame, and may transmit the generated first frame to a display 903 (e.g., the display 330 of FIG. 3) in operation 911. The first frame may be, for example, an image corresponding to the first view area 421 of the virtual reality 410 of FIG. 4.

In operation 912, the display 903 according to an embodiment may display the first frame provided from the processor 901.

In operation 913, the processor 901 according to an embodiment may sense a user motion event via a sensor module 902 (e.g., the sensor module 320 of FIG. 3). For example, the processor 901 may sense a user movement via the sensor module 902, when the display 903 displays the first frame.

In operation 914, the frame predictor 313 of the processor 901 according to an embodiment may predict at least a part of a second frame that is a subsequent frame, in response to sensing the user movement. The second frame may be, for example, an image corresponding to a second view area (e.g., the second view area 422 of FIG. 4) of the virtual reality 410 of FIG. 4. For example, the frame predictor 313 may determine the second view area 422, which is shifted from the first view area (e.g., the first view area 421 of FIG. 4), based on information associated with the sensed user movement, and may determine an overlap area 610 in which the objects of the first view area 421 are duplicately displayed and a new area 620 in which objects are newly added and displayed, in the second view area 422. According to an embodiment, the frame predictor 313 may obtain gradation values of objects included in the overlap area 610 and a variation in coordinate values, based on data information corresponding to the first frame, and may predict the second frame that is the subsequent frame, in advance based on the obtained information.

In operation 914, a comparer (e.g., the comparer 314 of FIG. 3) according to an embodiment may compare the first frame and the predicted second frame. In operation 914, an overdriving unit (e.g., the comparer 315 of FIG. 3) according to an embodiment may determine overdriving information based on a result of comparison between the first frame and the predicted second frame. For example, the overdriving information may include a weight value applied to data information applied to a plurality of pixels of the display 903.

In operation 915, the frame generator 312 of the processor 901 may generate the second frame based on the overdriving information, and may transmit the generated second frame to the display 903.

In operation 916, the display 903 according to an embodiment may display the second frame provided from the processor 901. According to an embodiment, the second frame includes overdriving information based on a user movement, and thus a pixel driving voltage may be quickly changed. Therefore, the electronic device (e.g., the electronic device 300 of FIG. 3) of the disclosure may prevent a deterioration, such as motion blurring, tailing, or generation of an afterimage (e.g., ghosting), in image quality of the display 903.

Figure 10:
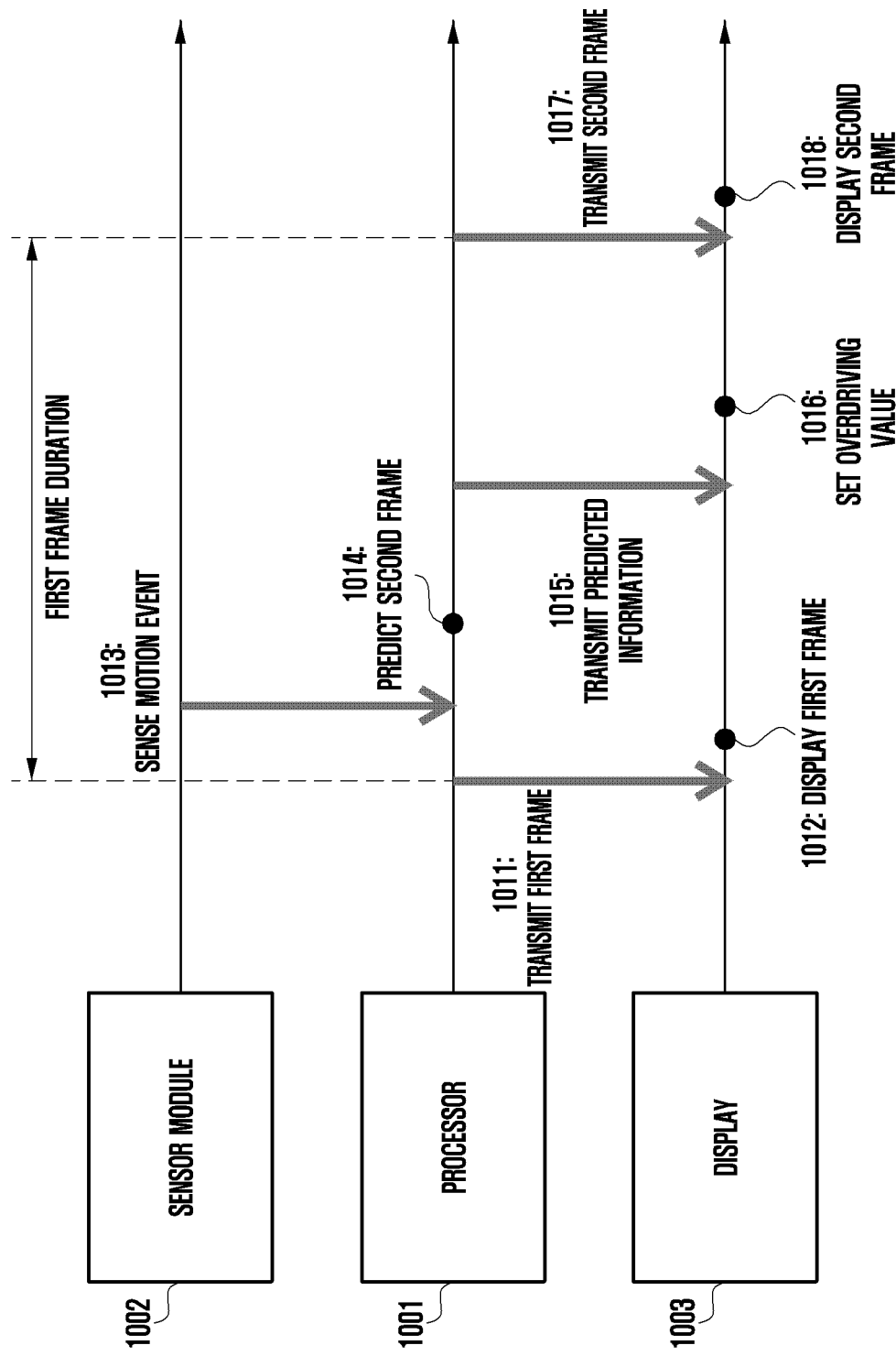
FIG. 10 is an operational flowchart of an electronic device according to another embodiment of the disclosure.

FIG. 10 is an operational flowchart of an electronic device according to another embodiment of the disclosure. For example, the embodiment of FIG. 10 illustrates that the display 330 directly generates overdriving information, unlike the embodiment of FIG. 9.

Referring to FIG. 10, a frame generator (e.g., the frame generator 312 of FIG. 3) of a processor 1001 (e.g., the processor 310 of FIG. 3) according to an embodiment may generate a first frame, which is a current frame, and may transmit the generated first frame to a display 1003 (e.g., the display 330 of FIG. 3) in operation 1011. The first frame may be, for example, an image corresponding to the first view area 421 of the virtual reality 410 of FIG. 4.

In operation 1012, the display 1003 according to an embodiment may display the first frame provided from the processor 1001.

In operation 1013, the processor 1001 according to an embodiment may sense a user motion event via a sensor module 1002 (e.g., the sensor module 320 of FIG. 3). For example, the processor 1001 may sense a user movement using the sensor module 1002, when the display 1003 displays the first frame.

In operation 1014, a frame predictor (e.g., the frame predictor 313 of FIG. 3) of the processor 1001 according to an embodiment may predict at least a part of a second frame that is a subsequent frame, in response to sensing a user movement. The second frame may be, for example, an image corresponding to a second view area (e.g., the second view area 422 of FIG. 4) of the virtual reality of FIG. 4 (e.g., the virtual reality 410 of FIG. 4). For example, the frame predictor 313 may determine the second view area 422, which is shifted from the first view area (e.g., the first view area 421 of FIG. 4), based on information associated with the sensed user movement, and may determine the overlap area 610 in which the objects of the first view area 421 are duplicately displayed and the new area 620 in which objects are newly added and displayed, in the second view area 422. According to an embodiment, the frame predictor 313 may obtain the gradation values of the objects included in the overlap area 610 and a variation in coordinate values, based on data information corresponding to the first frame, and may predict the second frame that is the subsequent frame, in advance based on the obtained information.

In operation 1015, the processor 1001 may transmit information associated with the predicted second frame to the display 1003.

In operation 1016, the display 1003 according to an embodiment may compare the first frame and the predicted second frame. In operation 1016, the display 1003 according to an embodiment may determine overdriving information based on a result of comparison between the first frame and the predicted second frame. For example, the overdriving information may include a weight value applied to data information applied to a plurality of pixels of the display 1003.

In operation 1017, the frame generator 312 of the processor 1001 may generate the second frame that is the subsequent frame, and may transmit the generated second frame to the display 1003.

In operation 1018, the display 1003 according to an embodiment may combine the second frame provided from the processor 1001 and the previously generated overdriving information, and may display the second frame based on a result of combination. According to an embodiment, the second frame includes overdriving information that is based on a user movement, and thus a pixel driving voltage may be quickly changed. Therefore, the electronic device (e.g., the electronic device 300 of FIG. 3) of the disclosure may prevent a deterioration, such as motion blurring, tailing, or generation of an afterimage (e.g., ghosting), in image quality of the display 1003.

Figure 11:
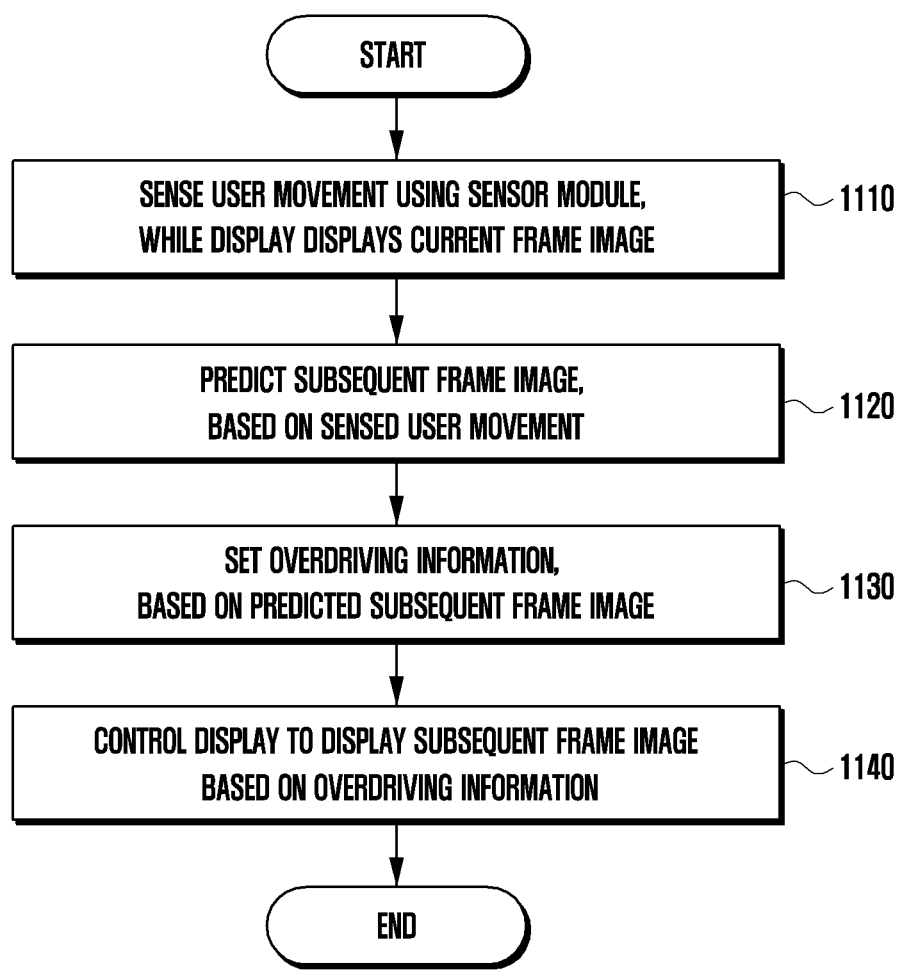
FIG. 11 is an operational flowchart of an electronic device according to various embodiments of the disclosure.

FIG. 11 is an operational flowchart of an electronic device according to various embodiments of the disclosure.

Referring to FIG. 11, a processor (e.g., the processor 310 of FIG. 3) according to an embodiment may sense a user movement using a sensor module (e.g., the sensor module 320 of FIG. 3), while a display (e.g., the display 330 of FIG. 3) displays a current frame image in operation 1110.

In operation 1120, the processor 310 according to an embodiment may predict a subsequent frame image, based on the sensed user movement. For example, the frame predictor (e.g., the frame predictor 313 of FIG. 3) of the processor 310 may sense a user movement using the sensor module 320, and may predict a subsequent frame image based on the sensed user movement. For example, based on the sensed user movement, the frame predictor 313 may extract a shifted image having coordinate values changed from the coordinate values at which the current frame image is mapped to the display 330, and may estimate that a subsequent frame image includes the shifted image.

In operation 1130, the processor 310 according to an embodiment may set overdriving information based on the predicted subsequent frame image. For example, the comparer (e.g., the comparer 314 of FIG. 3) of the processor 310 may compare a plurality of first gradation values used when the current frame image is mapped to a plurality of pixels of the display 330 and a plurality of second gradation values used when the predicted subsequent frame image is mapped to the plurality of pixels of the display 330.

In operation 1140, the processor 310 according to an embodiment may perform control so that the display 330 displays the subsequent frame image, based on the overdriving information. For example, the overdriving unit (e.g., the overdriving unit 315 of FIG. 3) of the processor 310 may determine the overdriving information, based on a result of comparison between the current frame image and the predicted subsequent frame image. For example, the overdriving information may include a weight value applied to data information applied to the plurality of pixels of the display 330.

As described above, before the processor generates the subsequent frame image, the electronic device of the disclosure may predict the subsequent frame image, based on the current frame, so as to determine the overdriving information in advance. Therefore, even though the electronic device of the disclosure is not equipped with a separate frame buffer, the electronic device is capable of performing overdriving, and thus the electronic device can increase the response speed of a display and can prevent a deterioration, such as motion blurring, tailing, or generation of an afterimage (e.g., ghosting), in the image quality of the display.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device, comprising:
a display;
a sensor module; and
a processor electrically connected to the display and the sensor module,
wherein the processor is configured to:
sense a user movement using the sensor module, while the display displays a current frame image;
predict a subsequent frame image, based on the sensed user movement;

set overdriving information, based on the subsequent frame image; and control the display to display the subsequent frame image on the display, based at least on the overdriving information.

2. The electronic device of claim 1, wherein the processor is configured to:

extract, based on the sensed user movement, a shifted image obtained by changing at least a part of coordinate values related to the current frame image; and estimate that the subsequent frame image includes the shifted image.

3. The electronic device of claim 2, wherein the processor is configured to: in response to a fact that the user movement is made in a first direction, change a first coordinate value related to the current frame image to a second coordinate value related to a second direction, which is opposite to the first direction; and extract the shifted image based on the second coordinate value obtained via changing.

4. The electronic device of claim 2, wherein the processor changes the coordinate value in proportion to a magnitude of the sensed user movement.

5. The electronic device of claim 2, wherein the processor is configured to:

set an area related to the extracted shifted image as an overdriving area; and obtain the overdriving information associated with the overdriving area.

6. The electronic device of claim 5, wherein the processor is configured to:

compare the current frame image and the predicted subsequent frame image, in the overdriving area; and determine the overdriving information, based on a result of the comparison.

7. The electronic device of claim 6, wherein the processor is configured to:

calculate a difference value between first data information corresponding to the current frame image and second data information corresponding to the predicted subsequent frame image, in the overdriving area; and generate the overdriving information by converting the second data information to enable the difference value to be high.

8. The electronic device of claim 1, wherein the processor is configured to sense a user head movement or a user visual line movement, using the sensor module.

9. The electronic device of claim 1, wherein the display includes a liquid crystal display, an OLED display, or a micro LED display.

10. A control method of an electronic device for increasing a response speed of a display, the method comprising:

sensing a user movement using a sensor module, while the display displays a current frame image;

predicting a subsequent frame image, based on the sensed user movement;

transmitting the predicted subsequent frame image to the display;

performing control so that the display sets overdriving information, based on the predicted subsequent frame image; and controlling the display to display the subsequent frame image, based on the overdriving information.

11. The method of claim 10, wherein the predicting the subsequent frame image comprises:

extracting, based on the sensed user movement, a shifted image obtained by changing at least a part of coordinate values related to the current frame image; and estimating that the subsequent frame image includes the shifted image.

12. The method of claim 11, wherein the setting the overdriving information comprises:

setting an area related to the extracted shifted image as an overdriving area; and obtaining the overdriving information associated with the overdriving area.

13. The method of claim 12, wherein the setting the overdriving information comprises:

comparing the current frame image and the predicted subsequent frame image, in the overdriving area; and determining the overdriving information, based on a result of comparison.

14. The method of claim 10, comprising:

sensing a user head movement or a user visual movement, using the sensor module.

15. The method of claim 10, wherein the electronic device is a head-mounted-device (HMD).

* * * * *